Oct. 9, 1945.  R. R. DREISBACH  2,386,449
RECOVERY OF RUBBER-LIKE PRODUCTS FROM EMULSIONS
Filed April 14, 1942
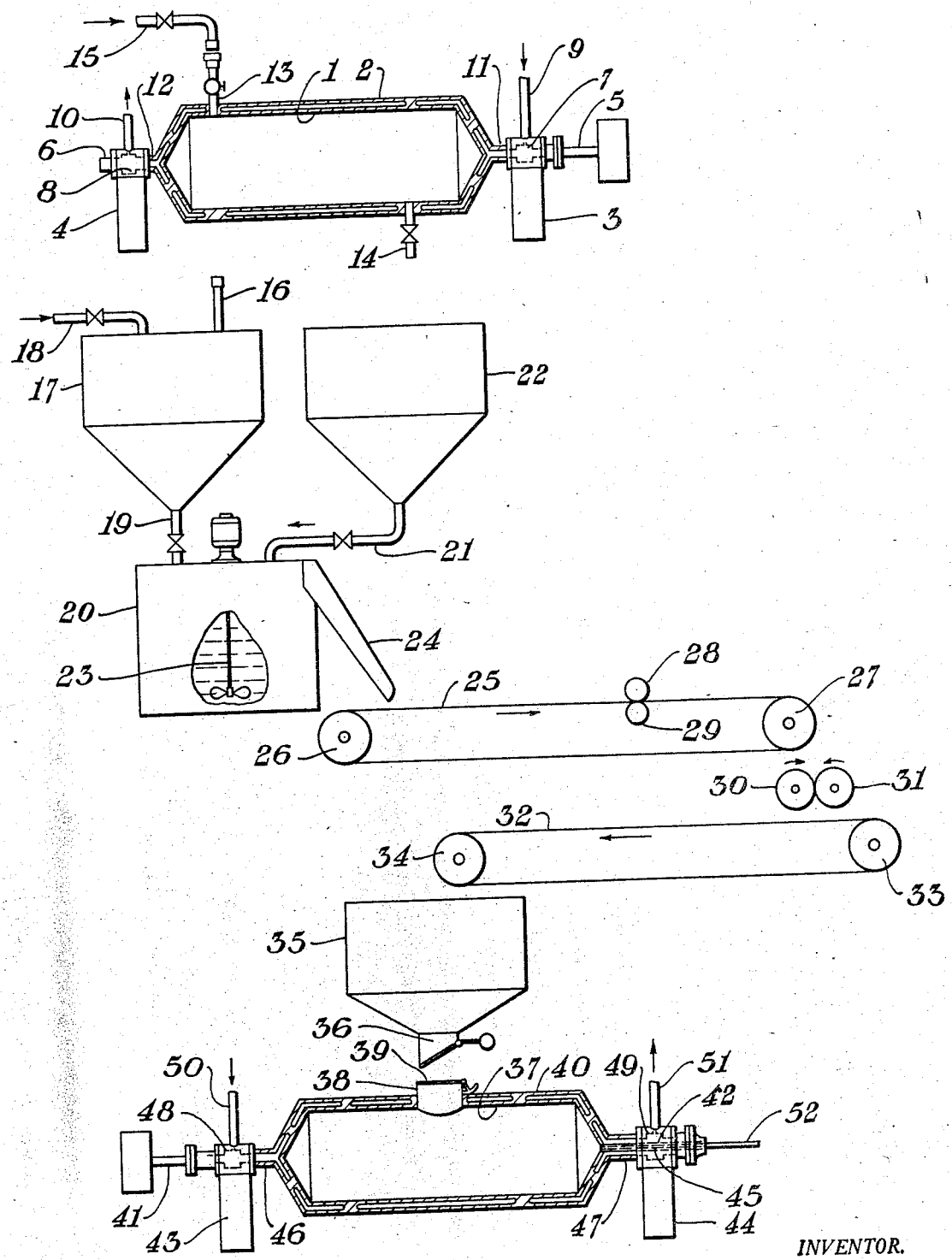
INVENTOR.
Robert R. Dreisbach
BY
Griswold & Burdick
ATTORNEYS Patented Oct. 9, 1945

2,386,449

UNITED STATES PATENT OFFICE 2,386,449

RECOVERY OF RUBBERLIKE PRODUCTS FROM EMULSIONS

Robert R. Dreisbach, Midland, Mich., assignor to The Dow Chemical Company, Midland, Mich., a corporation of Michigan Application April 14, 1942, Serial No. 438,874

5 Claims. (Cl. 260—93)

This invention concerns an improved method for the recovery of synthetic solid rubber-like substances from aqueous emulsions containing the same.

The rubber-like polymers and co-polymers of conjugated diolefines, commonly termed "synthetic rubber," are usually prepared by polymerizing the diolefine or a mixture of the diolefine and a co-polymerizing agent such as vinyl cyanide, styrene, methyl vinyl ketone, or methyl isopropenyl ketone, etc., while in aqueous emulsion. The resultant emulsion of the product resembles natural rubber latex and the product may be recovered therefrom by procedures similar to those employed in recovering natural rubber from its latex. In the commercial production of rubber, the usual procedure is to treat the latex with a small amount of a stabilizer, i. e. an anti-oxidant, and then to treat the latex in a vat with a coagulating agent such as formic or acetic acid, whereby the rubber separates from the emulsion in the form of a water-logged lump or mass. The mass is lifted from the vat, cut when necessary into pieces of size suitable for feeding to rolls, and is washed with water during passage through the rolls, after which it is further rolled to press the same into a form which will permit fairly rapid drying and which is suitable for subsequent packing for shipment. The rolls are usually designed and operated to produce rubber sheeting or crepe which is suspended from racks and is air-dried for several days at a moderately elevated temperature, e. g. about 50° C., so as to avoid the stretching or tearing which might occur at higher drying temperatures. Drying is usually continued until the water content of the product is reduced to between 20 and 30 per cent by weight. This usual method is time-consuming and requires much manual labor.

It is an object of this invention to provide a method whereby the recovery of rubber-like products from emulsions may be accomplished rapidly and with a minimum of labor. Other objects will be apparent from the following description of the invention.

I have found that by vigorously stirring a synthetic latex during addition of a coagulating agent thereto, the rubber-like product may be caused to coagulate in the form of small irregularly shaped pieces having an appearance similar to that of cottage cheese. It is important that the stirring be vigorous since otherwise the coagulated material tends to rise and collect at the surface of the mixture where the pieces rapidly coalesce or become cemented together as a porous mass which is poorly suited for further handling. However, by continuously feeding the emulsion and the coagulating agent into the container until the latter is filled to overflowing, while at the same time vigorously stirring the mixture, the bits of coagulated product are distributed throughout the mixture and are prevented from adhering together and are carried from the container at a substantially uniform rate by the overflowing liquid.

I have also found that the loose product thus obtained is well suited to subsequent handling, e. g. drying in continuous or semi-continuous manner. Although the bits of wet product, if permitted to stand without agitation for only a short time, e. g., 10 minutes or longer, tend to cement together with formation of a porous mass, this tendency is lessened as the product is dried. By promptly draining excess water from the product as it overflows from the coagulation chamber and pressing additional water from the product, e. g. with rolls, the tendency for the granules to adhere to one another is reduced and the product may be permitted to stand in thin beds, e. g. of less than one foot thickness, for some time, e. g. one hour or longer, before appreciable cohesion of the granules occurs. Furthermore, when such cohesion of the bits of partially dried product does occur, the cohesive forces between the particles making up the resultant porous mass are usually quite weak so that the material may again be granulated by passage through a shredding machine or similar device for tearing the granules apart from one another.

I have further found that the partially dried granular product may quite rapidly be further dried at temperatures higher than are suitable for the drying of sheet or crepe rubber, and that such further drying may advantageously be carried out in a rotating vacuum oven having smooth and curved interior surfaces. If the drying at elevated temperatures is carried out on stationary trays or pans, the granules of product become cemented together with formation of a porous mass. If during final drying the product is agitated by means of blades, e. g. by stirring the same with a blade-like device or by drying the product in a rotating oven having internal baffles or blade-like projections, the product occludes to the blades with formation of a rubbery mass which is difficult to remove. By carrying out the final drying in a rotating oven having smooth internal surfaces, the granules of product do not become matted together or occlude to the oven surfaces, so that the dried product is readily discharged from the oven and is obtained in granular form. After being dried, e. g. to a moisture content of less than two per cent by weight, the granules may be stored at room temperature in beds of less than one foot depth for several days without becoming cemented together. However, the dried granular product may readily be molded, e. g. pressed or rolled, at room temperature or at elevated temperatures, into uniform blocks, sheets or crepe suitable for shipment.

On the basis of the discoveries just mentioned, I have devised the following improved method for the recovery of rubber-like products from emulsions.

The accompanying drawing is a diagrammatic sketch showing an arrangement of apparatus suitable for use in practicing the invention. In the drawing the numeral 1 designates a rotating autoclave, or "tumbler," having smooth curved internal surfaces. The autoclave is provided with a surrounding jacket 2 through which water, air or other heating or cooling fluid may be passed. The bearing blocks 3 and 4, which support the respective shafts 5 and 6 projecting lengthwise from the opposite ends of the autoclave, are hollowed so as to form the annular spaces 7 and 8 about the shafts. A fluid inlet 9 connects with the annular space 7 and a fluid outlet 10 leads from the other annular space 8. The jacket 2 of the autoclave is provided at its opposite ends with the sleeves 11 and 12 which project about the respective shafts 5 and 6 part way into the bearing blocks 3 and 4, thus forming a continuous opening so that a fluid introduced at inlet 9 will flow through the jacket 2 surrounding the autoclave and will flow from the apparatus through outlet 10.

The autoclave 1 is also provided with the projecting valved pipes 13 and 14. Pipe 13 is fitted as indicated with a half of a pipe union and may be connected with either the inlet line 15 or an outlet line 16, each of which lines is provided with a half-union capable of being mated with that on pipe 12 to form a full union.

Line 16 leads to a storage tank 17 which may be provided with another inlet line 18 for the introduction of a stabilizing agent. A valved line 19 leads from tank 17 to a coagulation chamber 20. The latter is also provided with a valved inlet line 21 which leads from another storage tank 22. A mechanical stirrer 23 projects into the chamber 20. Toward the top of chamber 20 is an overflow trough or flume 24 which is positioned so as to discharge material overflowing from chamber 20 onto a moving perforated belt 25, which may be constructed of metal screening. The belt 25 is supported by the pulleys 26 and 27, one or both of which may be actuated by usual means, not shown. The belt 25 passes between the rollers 28 and 29 which are preferably constructed of rubber or other soft, resilient material and which are positioned so as to firmly press the belt 25 between the same. The rollers 28 and 29 may be actuated by the lengthwise movement of the belt 25, but they are preferably driven by other usual means not shown, e. g. a belt or chain, at a rate corresponding to the movement of the belt 25.

The pulley 27, supporting the belt 25, is positioned above a pair of steel, or other metal rollers 30 and 31 so that solids which drop from belt 25 will be fed between the rollers. The rollers 30 and 31 are closely positioned, face to face, and are rotated by usual means not shown. Drains, not shown, are, of course, provided for withdrawing the water drained and pressed from the product. If desired, knife blades, not shown, may be positioned against the under faces of the rollers 30 and 31 to aid in removing adhering solids therefrom, but such blades are usually not required.

Below the rollers 30 and 31 is a conveyor belt 32, supported by the pulleys 33 and 34, which belt serves to convey the partially dried granular product to a storage bin 35. The latter is provided at its lower end with an outlet 36. Below the bin 35 is a rotatable vacuum drying oven 37 having smooth curved internal surfaces. The manhole 38 of oven 37, which manhole is provided with a hinged lid 39, is situated below the outlet 36 to the bin 35 so that material from the bin may be charged directly into the oven. The oven 37 is provided with a surrounding jacket 40 through which a heating fluid such as water, steam or air, etc., may be passed. The shafts 41 and 42 project from the opposite ends of oven 37 through the respective bearing blocks 43 and 44. The shaft 42 is provided with a central bore 45 through which vapors may be withdrawn from the oven. The jacket 40 to oven 37 is provided at its opposite ends with the sleeves 46 and 47 which project about the respective shafts 41 and 42 to the respective cavities 48 and 49 in the bearing blocks 43 and 44. A fluid inlet 50 leads to the cavity 48 in bearing block 43 and an outlet 51 leads from the cavity 49 in bearing block 44. Channels are thus provided whereby a heating fluid may be fed to and withdrawn from the annular space between the oven 37 and its surrounding jacket 40. At the end of shaft 42 the bearing block 44 is fitted to a vapor line 52 which leads to a vacuum pump, not shown.

In producing a synthetic rubber using the apparatus illustrated in the drawing, an emulsion of the compound or compounds to be polymerized, or the ingredients necessary to form such emulsion, are charged into autoclave 1 through the inlet line 15 and pipe 13, after which the valves in pipe 13 and line 15 are closed and these lines are disconnected. As is well known, the starting materials used in forming such an emulsion comprise, as the essential ingredients, a conjugated diolefine or a mixture of a conjugated diolefine and one or more other unsaturated organic compounds capable of being co-polymerized therewith, water, an emulsifying agent, and preferably a per-oxygen compound such as hydrogen peroxide, sodium, potassium, or ammonium persulphate, or sodium, potassium, or ammonium perborate, etc., as a catalyst for the polymerization. In many instances acids, alkalies, or buffering agents are also added so as to obtain the pH value at which a particular polymerization occurs most favorably. Examples of polymerizable organic compounds which may be used as starting materials are butadiene-1.3, isoprene, 2.3-dimethyl-butadiene-1.3, mixtures of butadiene-1.3 and styrene, mixtures of butadiene-1.3 and vinyl cyanide, mixtures of butadiene-1.3 and either methyl vinyl ketone or methyl isopropenyl ketone, mixtures of isoprene and styrene, etc. Mixtures of conjugated diolefines and other polymerizable organic compounds which may be polymerized in aqueous emulsion to obtain synthetic rubbers are known to the art. A variety of emulsifying agents which may be employed in forming the emulsions are also well known, examples being: ammonium oleate, esters of sulphuric acid and higher aliphatic alcohols such as lauryl and myristic alcohols, alkali salts of higher alcohol mono-esters of sulphuric acid, sulphonates and sulphonic acid derivatives of alkyl substituted aromatic hydrocarbons, egg albumen, blood serum, etc. The proportions in which the several starting materials may be employed are known to the art and in most instances may be varied widely, the preferred proportions depending upon the physical and mechanical properties desired in the rubber-like product. After being charged, the autoclave is rotated and a heating fluid, usually warm water, is introduced through inlet 9. The water flows through annular space 7 between the shell 1 and the jacket 2 of the autoclave, into annular space 8 and flows from the latter through outlet 10. The water is usually heated to about 55–65° C. so as to bring the reaction mixture to about the same temperature, but the polymerization may be carried out at lower or higher temperatures, e. g. at temperatures ranging from room temperature to 100° C. or higher. The time required for completion of the reaction varies from several hours to several days or longer, depending upon the particular compounds being polymerized and the catalyst and other reaction conditions employed.

When the polymerization is completed, rotation of the autoclave is discontinued and pipe 13 is connected with line 16. The valves in pipes 13 and 14 are then opened so as to permit flow of the emulsion from the autoclave 1 to the storage tank 17. An agent, such as phenyl beta-naphthylamine, di-(para-hydroxy-phenyl) cyclohexane, Antox (a condensation product of aniline and butyraldehyde) or any of the other antioxidants usually employed as stabilizers for natural rubber, is preferably added, e. g. through inlet 18. The proportion of antioxidant required varies, depending upon the particular agent used, but it is usually employed in amount corresponding to between 0.5 and 2 per cent of the dry weight of the rubber-like product. It will be understood, of course, that tank 17 may serve as a storage vessel for the emulsified product from a plurality of autoclaves and that by properly timing the discharge of the different autoclaves into tank 17, the antioxidant may, if desired, be added continuously and the treated emulsion may be withdrawn continuously from the tank.

The valve in line 19 is opened sufficiently to permit steady flow of the emulsion from tank 17 into the coagulation chamber 20. While continuing flow of the emulsion to chamber 20, a coagulating agent is introduced in steady flow from the storage tank 22 through line 21 and the stirrer 23 is rotated at sufficient speed to cause the rubber-like product to coagulate in the form of small irregular shaped pieces having an appearance similar to that of cottage cheese. As the coagulating agent I preferably employ a dilute, e. g. 0.5 to 1 per cent aqueous solution of calcium chloride, but the agent may be used in other concentrations if desired. Also, other known coagulating agents, e. g. aqueous solutions of salts such as sodium chloride, sodium sulphate, ammonium chloride, barium chloride, aluminum sulphate, etc., may be used to effect the coagulation.

The coagulated product is swept from chamber 20 along with the overflowing liquid onto the moving screen belt 25. It is carried by the belt between the soft rollers 28 and 29, which serve to squeeze a large part of the water from the product. If desired, the product on the belt may conveniently be washed with fresh water prior to passage through said rollers, but this is not required.

During travel of the belt 25 over pulley 27, the product drops from the belt and falls between the rotating metal rollers 30 and 31 which serve to squeeze a further amount of water from the product. The water flows lengthwise along the line at which the rolls in the channel above the rollers meet and spills into a drain, not shown. The product, after passing between the rollers 30 and 31, drops onto the conveyor belt 32 which carries it to the bin 35. At this point in the process the product usually retains between 20 and 35 per cent by weight of moisture.

The partially dried granular product is periodically withdrawn from bin 35 and charged into the oven 37. The same bin may be, and preferably is, used to supply the partially dried product to a plurality of such ovens. When the oven is charged, usually about half full, with the product, the lid 39 of manhole 38 is closed, the oven is rotated and a heating fluid, e. g. hot water, heated air, or steam, etc., is introduced through inlet 50 for purpose of heating the oven. Vapors are withdrawn from the oven through line 52 by means of a vacuum pump, not shown. The rotating oven is usually heated at temperatures between 70° and 100° C., preferably between 80° and 90° C., while maintaining the internal vapor pressure at less than 400 millimeters absolute, and preferably less than 50 millimeters, until the moisture content of the product is reduced to less than 2 per cent. When operating under the preferred conditions just stated, the product may be rendered substantially anhydrous in less than 8 hours. After completing the drying operation the product is discharged from the oven through the manhole 38.

The dry, granular product may be compounded directly with usual rubber compounding agents, e. g. carbon black, fillers, sulphur or other vulcanizing agents, etc., and be shaped and cured to obtain final rubber-like products, or it may be molded or rolled into blocks, sheets, or crepe, etc., suitable for shipment in uncured condition to manufacturers of the finished articles.

The above-described method and/or apparatus may be modified or changed without departing from the invention. For instance, although a stabilizing agent is preferably added to the emulsified product prior to coagulating the latter, such addition of a stabilizing agent is not essential to the invention. It will also be apparent that instead of the belt 25 passing between the single pair of rolls 28 and 29, it may be passed between two or more of such pairs of rolls so as to repeatedly squeeze water from the material on the belt, and that prior to passage between the last of such pairs of rolls the material on the belt may be washed with water or other liquid. Still other ways in which the process or apparatus may be modified will be apparent to those skilled in the art.

Other modes of applying the principle of the invention may be employed instead of those explained, change being made as regards the method herein disclosed provided the step or steps stated by any of the following claims or the equivalent of such stated step or steps be employed.

I therefore particularly point out and distinctly claim as my invention:

1. In a method for recovering from an aqueous emulsion thereof a rubbery polymer which is composed at least in part of a chemically combined aliphatic conjugated diolefine and which is cohesive when permitted to stand without agitation while wet with water, the steps which consist in passing the emulsion and a substantially non-reactive water-soluble salt capable of coagulating the emulsion into admixture with one another while stirring the mixture to cause the rubbery material to coagulate in the form of small irregular shaped pieces having an appearance similar to that of cottage cheese, continuing said operations until the vessel in which the coagulation is carried out is filled to overflowing, whereby coagulated material is carried from said vessel together with the overflowing liquid, feeding the overflow onto a moving surface which is perforated so as to permit liquid to drain from the coagulated product, and continuously squeezing water from the product.

2. In a method for recovering from an aqueous emulsion thereof a synthetic rubbery polymeric product which is composed at least in part of a chemically combined aliphatic conjugated diolefine and which is cohesive when permitted to stand without agitation while wet with water, the steps which consist in passing the emulsion and a substantially non-reactive water-soluble salt capable of coagulating the emulsion into admixture with one another while stirring the mixture to cause the rubbery substance to coagulate in the form of small irregular shaped pieces having an appearance similar to that of cottage cheese, which pieces are carried from the vessel in which the coagulation is accomplished together with the overflowing liquid, feeding the overflow onto a moving surface which is perforated so as to permit water to drain readily from the coagulated product, and continuously pressing water from the product.

3. In a method for recovering from an aqueous emulsion thereof a synthetic rubbery co-polymer of a conjugated diolefine, which copolymer is cohesive when permitted to stand without agitation while wet with water, the steps which consist in passing the emulsion and a substantially non-reactive water-soluble salt capable of coagulating the emulsion into admixture with one another while stirring the mixture to cause the co-polymer to coagulate as small irregular shaped pieces having an appearance similar to that of cottage cheese, continuing said operations to cause an overflow of the mixture from the vessel in which the coagulation is carried out, whereby coagulated material is carried from said vessel together with the overflowing liquid, feeding the overflow onto a moving surface which is perforated so as to permit water to drain readily from the coagulated product, and continuously pressing a further amount of water from the product.

4. In a method for recovering from an aqueous emulsion thereof a synthetic rubbery co-polymer of a conjugated diolefine, which copolymer is cohesive when permitted to stand without agitation while wet with water, the steps which consist in passing the emulsion and a substantially non-reactive water-soluble salt capable of coagulating the emulsion into admixture with one another while stirring the mixture to cause the copolymer to coagulate as small irregular shaped pieces having an appearance similar to that of cottage cheese, continuing these operations to cause an overflow of the mixture from the vessel in which the coagulation is carried out, whereby coagulated material is carried from said vessel together with the overflowing liquid, feeding the overflow onto a moving surface which is perforated so as to permit water to drain readily from the coagulated product, continuously pressing the coagulated product, continuously pressing a further amount of water from the product, removing the product from the moving surface and thereafter evaporating residual moisture from the product by heating the same at sub-atmospheric pressure to a temperature between 70° to 100°.

5. In a method for recovering from an aqueous emulsion thereof a synthetic rubbery co-polymer of a conjugated diolefine, which copolymer is cohesive when permitted to stand without agitation while wet with water, the steps which consist in passing the emulsion and a substantially non-reactive water-soluble salt capable of coagulating the emulsion into admixture with one another while stirring the mixture to cause the co-polymer to coagulate as small irregular shaped pieces having an appearance similar to that of cottage cheese, continuing these operations to cause an overflow of the mixture from the vessel in which the coagulation is carried out, whereby coagulated material is carried from said vessel by the overflowing liquid, pressing water from the product thus withdrawn from said vessel, and further drying a mass of the residual granular co-polymer by heating the same at sub-atmospheric pressure to a temperature between 50° and 100° C. while tumbling the material to prevent agglomeration and occlusion of the material to the supporting surface.

ROBERT R. DREISBACH.